United States Patent
Weaver et al.

(10) Patent No.: US 12,237,747 B2
(45) Date of Patent: Feb. 25, 2025

(54) ELECTRICAL CONNECTOR WITH COMPRESSION MOUNTING CLIPS

(71) Applicants: TE CONNECTIVITY SERVICES GMBH, Schaffhausen (CH); Emerson Electric Co., St. Louis, MO (US)

(72) Inventors: Brian Keith Weaver, Middletown, PA (US); Jeffrey Hummel, Middletown, PA (US); Divya Shukla, Middletown, PA (US); William James Moyer, II, Middletown, PA (US); Heath McClung, St. Louis, MO (US)

(73) Assignees: TE CONNECTIVITY SERVICES GMBH, Schaffhausen (CH); Emerson Electric Co., St. Louis, MO (US)

( * ) Notice: Subject to any disclaimer, the term of this patent is extended or adjusted under 35 U.S.C. 154(b) by 692 days.

(21) Appl. No.: 17/368,428

(22) Filed: Jul. 6, 2021

(65) Prior Publication Data

US 2023/0009474 A1  Jan. 12, 2023

(51) Int. Cl.
*H01R 13/00* (2006.01)
*H01R 13/506* (2006.01)
*H01R 13/631* (2006.01)
*H02K 5/22* (2006.01)
*H02K 15/00* (2006.01)

(52) U.S. Cl.
CPC ........... *H02K 5/225* (2013.01); *H01R 13/506* (2013.01); *H01R 13/631* (2013.01); *H02K 15/0062* (2013.01); *H01R 2201/10* (2013.01)

(58) Field of Classification Search
CPC . H01R 13/506; H01R 13/631; H01R 2201/10
See application file for complete search history.

(56) References Cited

U.S. PATENT DOCUMENTS

| | | | |
|---|---|---|---|
| 4,004,169 A | 1/1977 | Charlton | |
| 4,132,460 A | 1/1979 | Porta | |
| 4,389,021 A | 6/1983 | Coldren | |
| 4,921,454 A | 5/1990 | Atherton et al. | |
| 5,181,862 A | 1/1993 | Hawk et al. | |
| 8,840,381 B2 * | 9/2014 | Fukasaku | F04B 35/04 310/71 |
| 9,068,563 B2 | 6/2015 | Fukasaku | |
| 9,194,394 B2 | 11/2015 | Yamada et al. | |
| 9,234,527 B2 | 1/2016 | Fukasaku et al. | |
| 9,366,243 B2 | 6/2016 | Yamada et al. | |
| 9,394,907 B2 | 7/2016 | Fukasaku et al. | |
| 9,404,503 B2 | 8/2016 | Watanabe et al. | |

(Continued)

OTHER PUBLICATIONS

Extended European Search Report for European Application No. 22182965.8 dated Feb. 14, 2023.

*Primary Examiner* — Phuong Chi Thi Nguyen

(57) ABSTRACT

An electrical connector has a housing with a front surface, a rear surface, and side surfaces. A first wall extends between the front surface, the rear surface and the side surfaces. A second wall extends between the front surface, the rear surface and the side surfaces, the second wall having a radiused reference surface. An alignment projection extends from the radiused reference surface in a direction away from the first wall. Compression clips extend from the side surfaces. The compression clips have bases, beams and a latching projections, with the beams extending at angles relative to the side surfaces.

19 Claims, 3 Drawing Sheets

(56) References Cited

U.S. PATENT DOCUMENTS

| | | |
|---|---|---|
| 10,164,495 B2 | 12/2018 | Hamana et al. |
| 10,707,715 B2 | 7/2020 | Hamana et al. |
| 10,738,780 B2 | 8/2020 | Fukasaku et al. |
| 2013/0004345 A1 | 1/2013 | Horiba et al. |
| 2020/0328565 A1 | 10/2020 | Wei et al. |
| 2020/0343783 A1 | 10/2020 | Takimoto et al. |

\* cited by examiner

ELECTRICAL CONNECTOR WITH COMPRESSION MOUNTING CLIPS

FIELD OF THE INVENTION

The present invention is directed to an electrical connector with compression mounting clips. In particular, the invention is directed to an electrical connector which can be mounted to the inside diameter of an electrical motor stator.

BACKGROUND OF THE INVENTION

Multi-position connectors are known for use in compact motors such as hybrid type stepping motor of two or more phases. Conventional multi-position connector has a conductor portion having winding holding portions for directly connecting to end portions of respective excitation windings within the motor stator, and a connecting portion for establishing an electric connection when mated with a complimentary mating connector. The conventional multi-position connector is positioned on an insulator of the motor. While these known connectors are beneficial, there are several disadvantages associated with known connectors.

One such disadvantage is that the positioning of the connector is not well controlled, as there is no reference surface or position to which the connector is attached. Consequently, when automated assembly is desired, it is difficult for the automation equipment to properly and precisely mount and terminate the connector, as there is no defined reference point to facilitate the termination by the automated equipment.

In addition, transportation of a stator with a connector assembled thereto can be difficult, as the positioning of the connector can vary. In addition, as the connectors are located outside the of the dimensions of the stator, the connectors may get damaged. The location of the assembled connectors can also interfere with the continued automated assembly of the stator.

It would, therefore, be desirable to provide an electrical connector that overcomes the problems associated with conventional multi-position connectors. In particular, it would be beneficial to provide an electrical connector which allows for precise mounting to a curved surface and to an inside diameter of a motor stator.

SUMMARY OF THE INVENTION

An embodiment is directed to an electrical connector which has a housing with a front surface, a rear surface, and side surfaces. A first wall extends between the front surface, the rear surface and the side surfaces. A second wall extends between the front surface, the rear surface and the side surfaces, the second wall having a radiused reference surface. An alignment projection extends from the radiused reference surface in a direction away from the first wall.

An embodiment is directed to an electrical connector for mounting to a radiused surface. The electrical connector includes a housing having a front surface, a rear surface, and side surfaces. A first wall extends between the front surface, the rear surface and the side surfaces. A second wall extends between the front surface, the rear surface and the side surfaces. The second wall has a radiused reference surface. One or more compression clips extend from one or both of the side surfaces. Each compression clip may have a base, a beam and a latching projection, with the beam extending at angles relative to the side surface.

An embodiment is directed to an electrical connector for mounting to an inside surface of an electrical motor stator. The electrical connector includes a housing having a front surface, a rear surface, and side surfaces. A first wall extends between the front surface, the rear surface and the side surfaces. A second wall extends between the front surface, the rear surface and the side surfaces. The second wall has a radiused reference surface. An alignment projection extends from the radiused reference surface in a direction away from the first wall. A registration projection is provided on the second wall and extends from the second reference surface in a direction away from the first wall. The registration projection is provided proximate the front surface. Compression clips extend from the side surfaces. The compression clips have latching projections provided at free ends thereof.

An embodiment is directed to an electrical motor stator having a stator housing and an electrical connector. The stator housing has slots spaced about an opening radiused surface of an inside opening of the stator housing. The slots extend in a direction which is parallel to a longitudinal axis of the stator housing. Slot openings extend from the opening radiused surface to the slots, tooth tips are provided at the intersection of the slot openings with the slots. The electrical connector is mounted on the opening radiused surface. The electrical connector includes a connector housing with a housing radiused reference surface. A radius of the housing radiused surface is the same as a radius of the opening radiused surface. An alignment projection extends from the housing radiused reference surface. The alignment projection is positioned in a respective slot opening. The housing radiused reference surface provides a bearing surface contact between the electrical connector and the opening radiused surface of the stator housing, and the alignment projection provides proper alignment and orientation of the electrical connector to the stator housing.

An embodiment is directed to a method of mounting an electrical connector to a radiused inside surface of an electrical motor stator. The method includes: positioning a radiused reference surface of the electrical connector proximate the radiused inside surface of the electrical motor stator; positioning an alignment projection of the electrical connector proximate a first slot opening positioned in the inside surface of the electrical motor stator; moving the alignment projection into first slot opening to position the electrical connector proximate the radiused inside surface of an electrical motor stator and minimize the movement of the electrical connector in a direction perpendicular to a longitudinal axis of the first slot opening; and engaging a second surface of the electrical motor stator with a registration projection on the electrical connector to properly position the electrical connector relative to the electrical motor stator.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
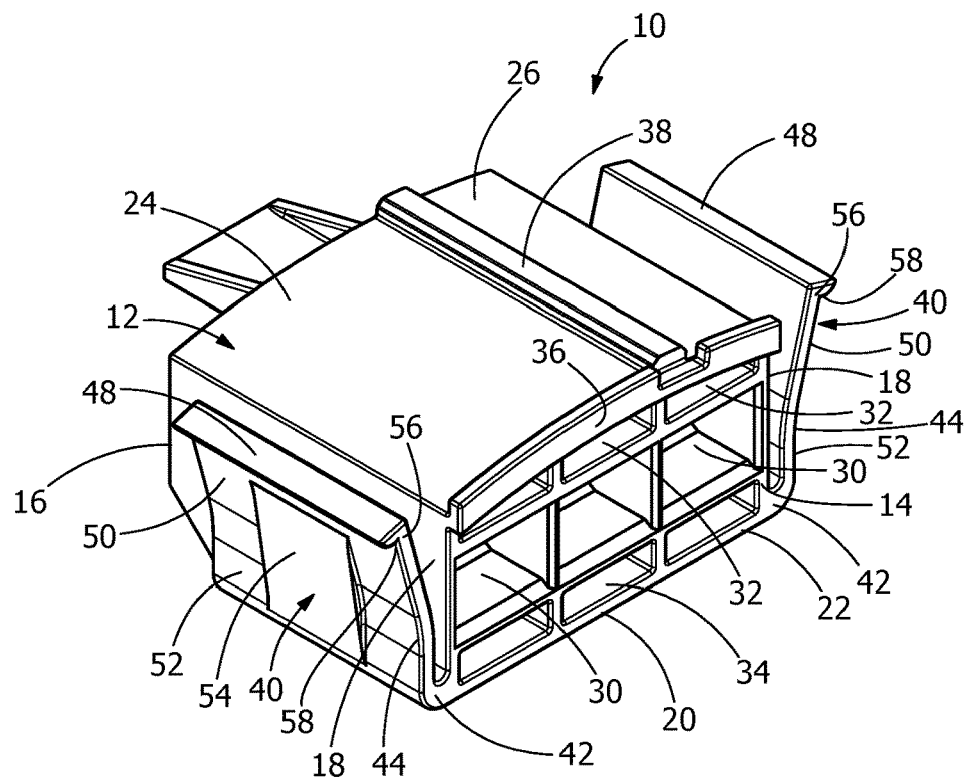
FIG. 1 is a top front perspective view of an illustrative embodiment of the electrical connector of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Referring to FIG. 1, an electrical connector 10 has a housing 12 with a front surface 14, a rear surface 16, and side surfaces 18. A first wall 20 extends between the front surface 14, the rear surface 16 and the side surfaces 18. Depending upon the type of mating connector and the assembly to which the mating connectors are attached, the size and shape of each of the side surfaces 18 may vary. The first wall 20 has a first reference surface 22. In the illustrative embodiment shown, the first reference surface 22 is a planar surface. A second wall 24 extends between the front surface 14, the rear surface 16 and the side surfaces 18. The second wall 24 has a second reference surface 26. In the illustrative embodiment shown, the second reference surface 26 is a radiused surface.

One or more terminal receiving cavities 30 extend from a front surface 16 to a rear surface 18. In the illustrative embodiment shown, three terminal receiving cavities 30 are provided. However, other numbers and configurations of terminal receiving cavities 30 may be provided.

In the illustrative embodiment shown, the terminal receiving cavities 30 are spaced from the second reference surface 26 by cavities 32. The terminal receiving cavities 30 are spaced from the first reference surface 22 by cavities 34. This allows the terminal receiving cavities 30 to be properly positioned to mate with a mating connector (not shown). Depending upon the type of mating connector and the assembly to which the mating connectors are attached, the size and shape of the cavities 32, 34 may vary, or one or more of them may not be needed.

A registration shoulder or projection 36 is provided on the second wall 24 and extends from the second reference surface 26 in a direction away from the first wall 20. The registration projection 36 is provided proximate the front surface 14. In the illustrative embodiment shown, the registration projection 36 extends from one side surface 18 to the opposite side surface 18, but other configurations of the registration projection 36 may be used.

An alignment rib or projection 38 is provided on the second wall 24 and extends from the second reference surface 26 in a direction away from the first wall 20. In the illustrative embodiment shown, the alignment projection 38 extends from the front surface 14 to the rear surface 16, but other configurations of the alignment projection 38 may be used.

Compression clips 40 extend from the side surfaces 18. Each compression clip 40 has a base 42, a beam 44 and a latching projection 48. The base 42 extends at approximately 90 degrees from the side surface 18. The base 42 is integrally molded to the housing 12. In various embodiments, the thickness of the material of the base 42 is thicker than that material of the first wall 20 and second wall 24. The increased thickness provides the strength needed to allow the base 42 to bend, without breaking, as the beam 44 is compressed, as will be more fully discussed.

Each beam 44 extends from the base 42. The beam 44 extend from the base 42 at an angle, for example, but not limited to, between 90 degrees and 120 degrees. Each beam 44 may be straight or have a first portion 50, which extend from a free end 56 of the beam 44, and a second portion 52, which extend from the bas 44. A transition portion 54 is provided between the first portion 50 and the second portion 52. The transition portion 54 has a larger cross-sectional area than the first portion 50 and/or the second portion 52 to provide additional strength and stability to the beam 44. The first portion 50 extends at an angle relative to a lower portion 52.

The latching projections 48 are provided at the free ends 56 of the beams 44. The latching projections 48 extend at approximately 90 degrees to the longitudinal axis of the beams 44. Each latching projection 48 has a latching shoulder 58.

Figure 2:
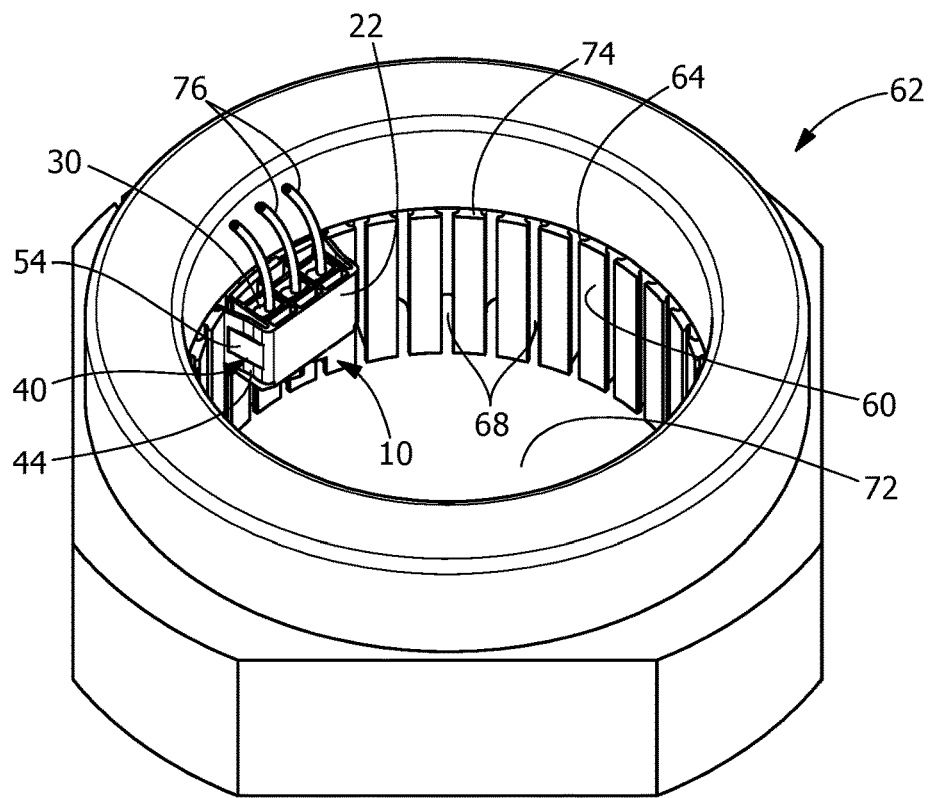
FIG. 2 is a perspective view of the connector of FIG. 1 mounted to an illustrative electric motor stator with the leads of the electric motor stator mounted therein.
Figure 5:
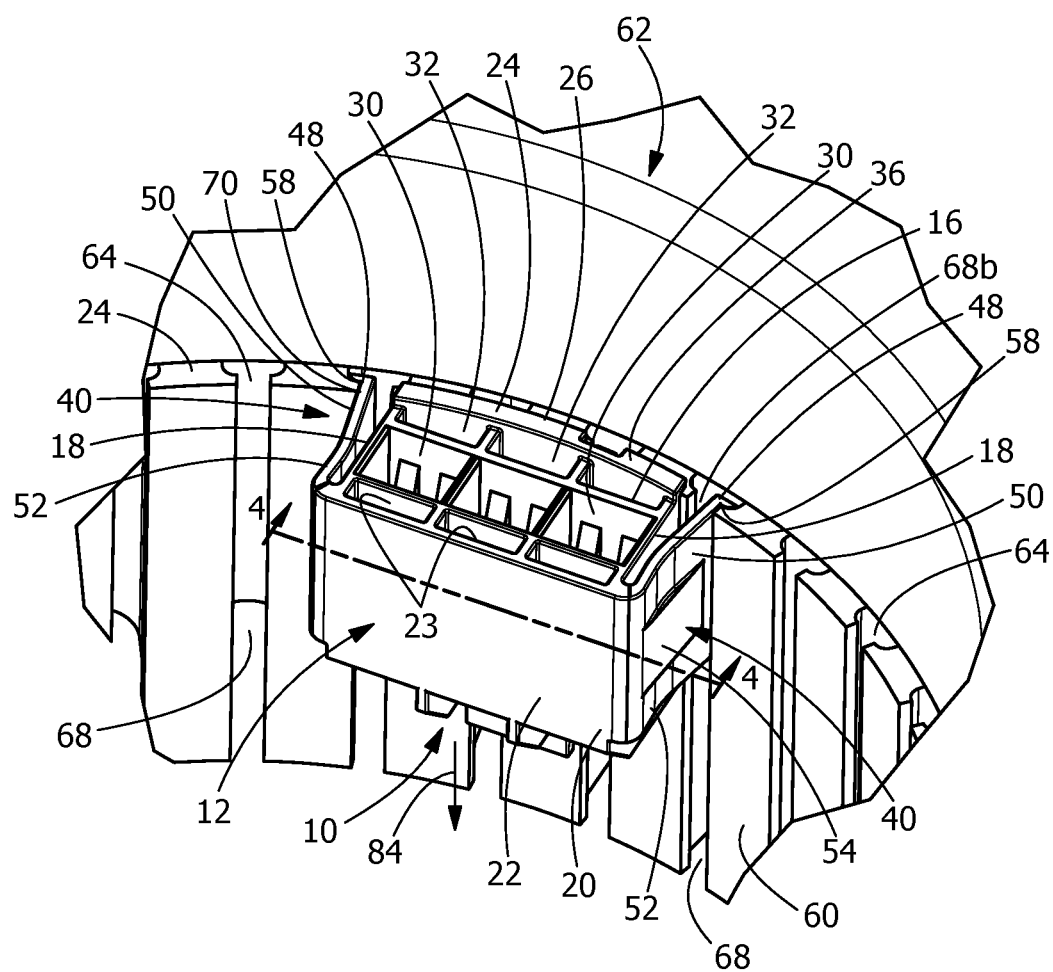
FIG. 5 is a perspective view, with the connector fully mated with the electrical motor stator.

The connector 10 is mounted on a radiused surface 60, as shown in FIGS. 2 and 5. In the illustrative embodiment shown, the radiused surface 60 is an inside radiused surface of an electrical motor stator 62. The radius of the radiused surface 60 is the same or approximately the same as the radius of the second reference surface 26 of second wall 24 of the connector 10. In other embodiments, the positioning of the radiused surface may vary and the configuration of the radiused surface 60 and the second reference surface 26 may also vary.

The stator 62 includes slots 64 which are spaced about the inside circumference of the stator 62. The slots 64 extend in a direction which is parallel to a longitudinal axis of the stator 62. As shown in FIG. 5, the slots 64 have tubular members or windings 66 which are positioned therein. Slot openings 68 extend from the radiused surface 60 to the slots 64. Tooth tips 70 are provided at the intersection of the slot openings 68 with the slots 64. Both slots 64 and slot openings 68 may be precisely positioned features of stator 62.

Figure 3:
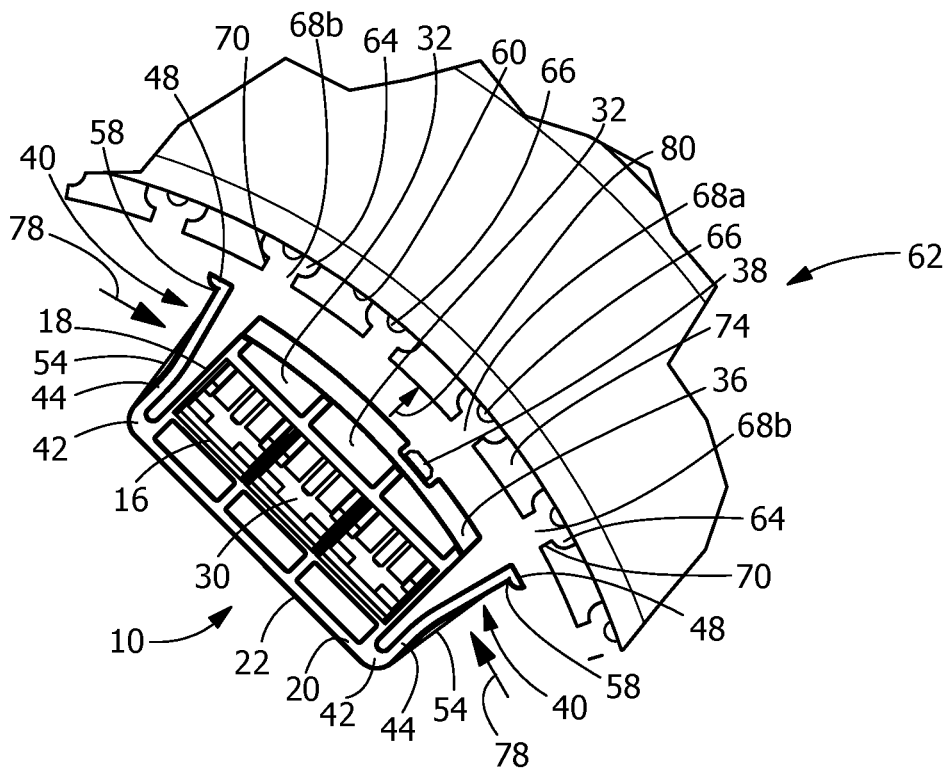
FIG. 3 is a top view of the connector of FIG. 1 shown prior to mating with the electrical motor stator.

During assembly, the connector 10 is moved into the inside opening 72 (FIG. 2) of the stator 62, as shown in FIG. 3. In this position, the front surface 14 and the registration projection 26 of the connector 10 are positioned proximate to, but above a top surface 74 of the stator 62. The connector 10 is positioned proximate the leads 76 (FIG. 2) of the stator 62.

The beams 44 of the compression clips 40 are moved inward or compressed to a stressed position, as indicated by arrows 78 of FIG. 3. As this occurs, the connector 10 is moved toward the radiused surface 60 of the stator 62, as indicated by arrow 80.

As the connector 10 is moved, the alignment projection 38 is moved into a respective slot opening 68a of the stator 62. The insertion of the alignment projection 38 in the respective slot opening 68a of the stator 62 facilitates the proper positioning of the connector 10 on the radiused surface 60 of the stator 62. In addition, as the alignment projection 38 extends along the length of the connector 10, the engagement of the alignment projection 38 with the respective slot opening 68a provides stability to the connector 10 when fully mounted, minimizing the movement of the connector in a direction perpendicular to the longitudinal axis of the slot opening 68a. The distance that the alignment projection 38 extends from the second reference surface 26 of the second wall 24 is dimensioned to allow the alignment projection 38 to be retained in the respective slot opening 68a without extending into the slot 64.

As the connector 10 is moved, the latching projections 48 of the compression clips 40 are moved into respective slot openings 68b of the stator 62. The insertion of the latching projections 48 into the respective slot opening 68b of the stator 62 facilitates the proper positioning of the connector 10 on the radiused surface 60 of the stator 62. In addition, as the latching projections 48 extend along the length of the connector 10, the engagement of the latching projections 48 with the respective slot openings 68b provides stability to the connector 10 when fully mounted, minimizing the movement of the connector in a direction perpendicular to the longitudinal axis of the slot openings 68b. The length of the beams 44 is dimensioned to allow the latching projections 48 to extend through the respective slot openings 68b and into the slots 64. However, the beams 44 are dimensioned to allow the latching projections 48 to extend into the slots 64 without interfering with the tubular members or windings 66 positioned in the slots 64.

Figure 4:
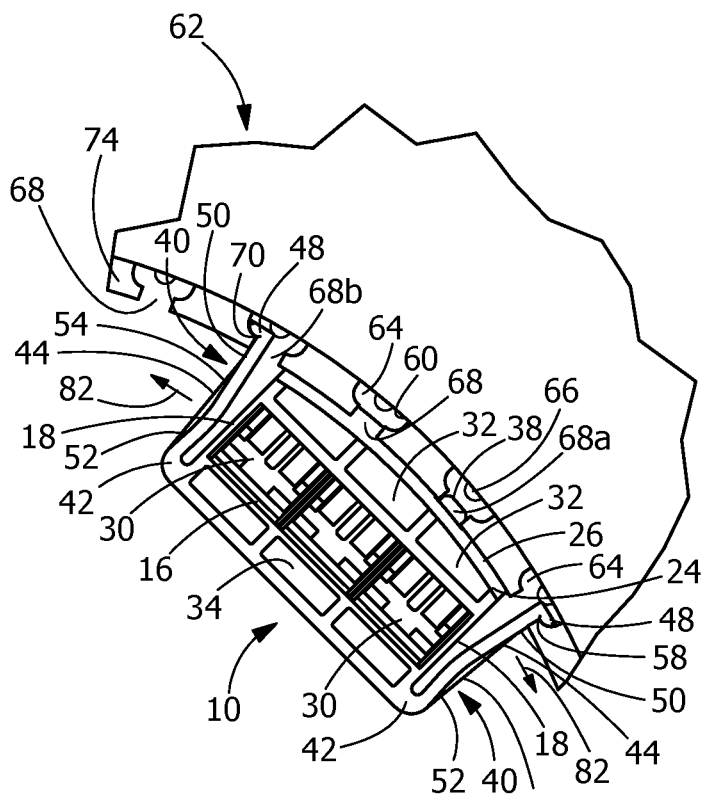
FIG. 4 is a top view of the connector, similar to that of FIG. 3, with the connector partially mated with the electrical motor stator.

With the radiused second reference surface 26 of the second wall 24 positioned in engagement with the radiused surface 60 of the stator 60, the alignment projection 30 positioned in the respective slot opening 68a, and the latching projections 48 of the compression clips 40 properly positioned in the respective slot openings 68b, the force on the compression clips 40 is released, allowing the compression clips 40 to return toward an unstressed position, as represented by arrows 82 in FIG. 4. In this position, the latching shoulders 58 of the latching projections 48 of the compression clips 40 are moved into engagement with the tooth tips 70 of the stator 62, thereby preventing unwanted removal of the connector 10 from the stator 62.

With the latching shoulders 58 of the latching projections 48 of the compression clips 40 positioned in engagement with the tooth tips 70 of the stator 62, the connector 10 is moved downward, as indicated by arrow 84 in FIG. 5. The movement continues until the registration projection 36 is moved into engagement with the top surface 74 of the stator 62. With the registration projection 36 moved into engagement with the top surface 74 of the stator 62, the connector 10 is properly and precisely positioned relative to the stator 62, thereby allowing the leads 76 to be properly positioned in the connector 10.

In addition, as the connector 10 is precisely positioned, the first reference surface 22 of the first wall 20 can be used as a reference surface for a mating connector (not shown). This allows for the controlled and accurate positioning of the mating connector relative to the connector 10 and the stator 62. The size and configuration of the cavities 32, 34 may be varied to properly position the first reference surface 22 to accommodate different mating connectors and their positioning.

The radiused second reference surface 26 allows for a good bearing surface contact between the connector 10 and the radiused surface 60 of the stator 62. The alignment projection 38 ensures proper alignment and orientation of the connector 10 during mating to the stator 62. The registration projection 36 can be manually biased against the top surface 74 of the stator 62 to ensure proper positioning of the connector 20 relative to the stator 62. The operation of the compression clips 40, which are manually squeezed during installation and released when properly positioned, securely locks the connector 10 to the stator 62.

The electrical connector 10 can be precisely mounted to a radiused surface 60, such as the inside surface of an electric motor stator 62. This allows the leads 76 of the motor stator 62 to be secured in a common location for shipment to final assembly. This helps to prevent damage to the leads 76 during shipment. In addition, the use of the connector 10 enables automated removal and final connection of the connector 10 during the final assembly process. Among other advantages, automation may provide labor savings, reduces connection failures, and avoids operator injury.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector comprising:
   a housing having a front surface, a rear surface, and side surfaces;
   a first wall extending between the front surface, the rear surface and the side surfaces;
   a second wall extending between the front surface, the rear surface and the side surfaces, the second wall having a radiused reference surface;
   an alignment projection extending from the radiused reference surface in a direction away from the first wall; and
   a registration projection provided on the second wall and extending from the radiused reference surface in a direction away from the first wall, the registration projection being provided proximate the front surface.

2. The electrical connector as recited in claim 1, wherein the alignment projection extends from the front surface to the rear surface.

3. The electrical connector as recited in claim 1, wherein the registration projection extends between the side surfaces.

4. The electrical connector as recited in claim 1, wherein the first wall has a planar reference surface.

5. The electrical connector as recited in claim 4, wherein one or more terminal receiving cavities extend from the front surface to the rear surface, the terminal receiving cavities being spaced from the radiused reference surface by first cavities, the terminal receiving cavities being spaced from the planar reference surface by second cavities.

6. The electrical connector as recited in claim 1, wherein one or more compression clips extend from one or both of the side surfaces.

7. The electrical connector as recited in claim 6, wherein each of the compression clips has a base, a beam and a latching projection.

8. The electrical connector as recited in claim 7, wherein the base extends at approximately 90 degrees from one or both of the side surfaces, the thickness of the base being thicker than that the first wall.

9. The electrical connector as recited in claim 8, wherein the beam extends from the base at an angle.

10. The electrical connector as recited in claim 9, wherein the beam has a first portion which extends from a free end of the beam and a second portion which extends from the base, the first portion extending at an angle relative to the second portion, a transition portion being provided between the first portion and the second portion, the transition portion having a larger cross-sectional area than the first portion or the second portion.

11. The electrical connector as recited in claim 8, wherein the latching projection is provided at a free end of the beam.

12. The electrical connector as recited in claim 11, wherein the latching projection extends at approximately 90 degrees to a longitudinal axis of the beam, the latching projection having a latching shoulder.

13. An electrical connector for mounting to an arcuate surface, the electrical connector comprising:
a housing having a front surface, a rear surface, and side surfaces;
a first wall extending between the front surface, the rear surface and the side surfaces;
a second wall extending between the front surface, the rear surface and the side surfaces, the second wall having a radiused reference surface; and
one or more compression clips extending from the side surfaces, each of the compression clips having a base, a beam and a latching projection, the beam extending at an angle relative to one or both of the side surfaces.

14. The electrical connector as recited in claim 13, wherein the beam has a first portion extending from a free end of the beam and a second portion extending from the base, the first portion extending at an angle relative to the second portion, a transition portion being provided between the first portion and the second portion, the transition portion having a larger cross-sectional area than the first portion or the second portion.

15. The electrical connector as recited in claim 13, wherein an alignment projection extends from the radiused reference surface in a direction away from the first wall.

16. The electrical connector as recited in claim 15, wherein a registration projection is provided on the second wall, the registration projection extending from the second reference surface in a direction away from the first wall, the registration projection being provided proximate the front surface.

17. The electrical connector as recited in claim 16, wherein one or more terminal receiving cavities extend from the front surface to the rear surface, the terminal receiving cavities being spaced from the second reference surface by first cavities, the terminal receiving cavities being spaced from the first reference surface by second cavities.

18. An electrical connector for mounting to an inside surface of an electrical motor stator, the electrical connector comprising:
a housing having a front surface, a rear surface, and side surfaces;
a first wall extending between the front surface, the rear surface and the side surfaces;
a second wall extending between the front surface, the rear surface and the side surfaces, the second wall having a radiused reference surface;
an alignment projection extending from the radiused reference surface in a direction away from the first wall;
a registration projection provided on the second wall and extending from the second reference surface in a direction away from the first wall, the registration projection is provided proximate the front surface; and
one or more compression clips extending from the side surfaces, each of the compression clips having a latching projection provided at a free end thereof.

19. The electrical connector as recited in claim 18, wherein the first wall has a planar reference surface.

* * * * *